(12) United States Patent  (10) Patent No.: US 7,405,489 B2
Leijon et al.  (45) Date of Patent: Jul. 29, 2008

(54) WAVE POWER ASSEMBLY

(75) Inventors: Mats Leijon, Uppsala (SE); Hans Bernhoff, Uppsala (SE)

(73) Assignee: Seabased AB, Uppsala (SE)

( * ) Notice: Subject to any disclaimer, the term of this patent is extended or adjusted under 35 U.S.C. 154(b) by 474 days.

(21) Appl. No.: 10/549,719

(22) PCT Filed: Mar. 22, 2004

(86) PCT No.: PCT/SE2004/000420

§ 371 (c)(1), (2), (4) Date: Sep. 15, 2005

(87) PCT Pub. No.: WO2004/085842

PCT Pub. Date: Oct. 7, 2004

(65) Prior Publication Data

US 2006/0208578 A1  Sep. 21, 2006

(30) Foreign Application Priority Data

Mar. 27, 2003 (SE) .................................. 0300869

(51) Int. Cl.
*F03B 13/12* (2006.01)
(52) U.S. Cl. .......................................... 290/42; 290/53
(58) Field of Classification Search ................... 290/42, 290/43, 44, 53, 54, 55
See application file for complete search history.

(56) References Cited

U.S. PATENT DOCUMENTS

| | | | | |
|---|---|---|---|---|
| 4,260,901 A | * | 4/1981 | Woodbridge | 290/42 |
| 4,539,485 A | * | 9/1985 | Neuenschwander | 290/53 |
| 5,136,173 A | * | 8/1992 | Rynne | 290/53 |
| 5,411,377 A | * | 5/1995 | Houser et al. | 417/333 |
| 5,696,413 A | * | 12/1997 | Woodbridge et al. | 310/15 |
| 6,020,653 A | * | 2/2000 | Woodbridge et al. | 290/53 |
| 6,768,217 B2 | * | 7/2004 | Chalmers et al. | 290/53 |
| 6,791,205 B2 | * | 9/2004 | Woodbridge | 290/53 |
| 7,045,912 B2 | * | 5/2006 | Leijon et al. | 290/42 |
| 7,164,212 B2 | * | 1/2007 | Leijon et al. | 290/42 |
| 7,245,041 B1 | * | 7/2007 | Olson | 290/53 |
| 7,304,399 B2 | * | 12/2007 | Leijon et al. | 290/42 |
| 7,323,790 B2 | * | 1/2008 | Taylor et al. | 290/42 |

FOREIGN PATENT DOCUMENTS

| | | |
|---|---|---|
| GB | 2 272 026 A | 5/1994 |
| WO | WO 01/06119 A1 | 1/2001 |
| WO | WO 2004/085842 A1 | 10/2004 |

* cited by examiner

*Primary Examiner*—Nicholas Ponomarenko
(74) *Attorney, Agent, or Firm*—The Maxham Firm

(57) ABSTRACT

The invention relates to a wave power assembly having a hull and a linear electric generator. The rotor of the generator is connected with the hull. The stator thereof is arranged to be anchored at a sea/lake bottom. According to an embodiment of the invention, the rotor is mounted in the cross direction by means of rolling elements. These are arranged between rolling surfaces on the rotor and support surfaces of a support means. The rolling elements are arranged to roll against the rolling surfaces and the support surfaces. The invention also relates to a wave power plant built up from wave power assemblies according to the invention. Furthermore, the invention relates to a use of the wave power assembly and a method for generating electric energy.

42 Claims, 5 Drawing Sheets

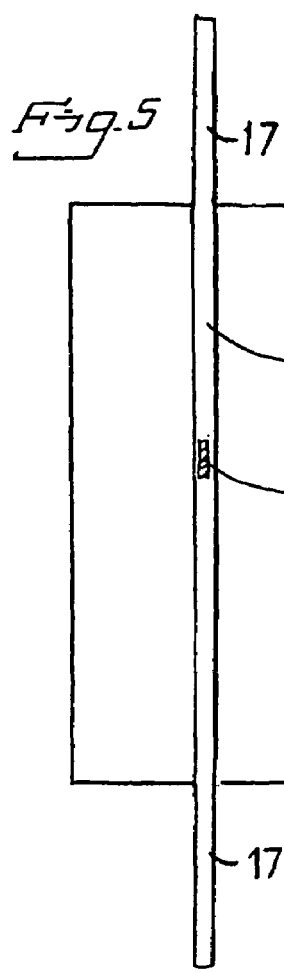
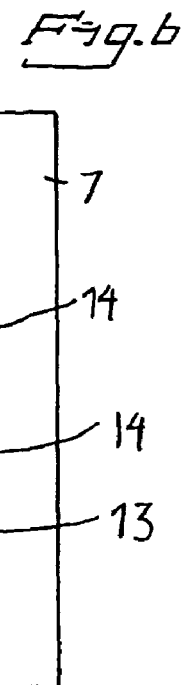
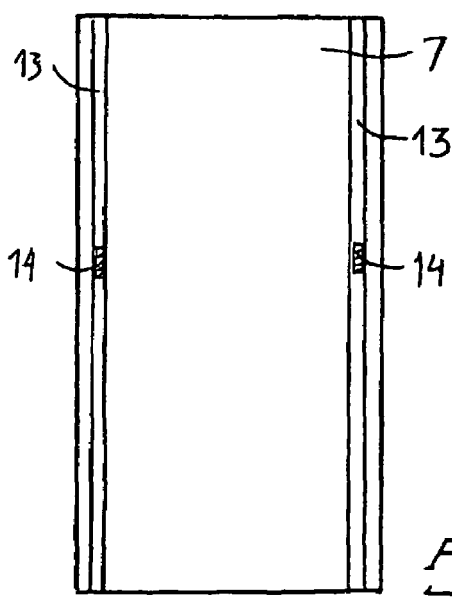
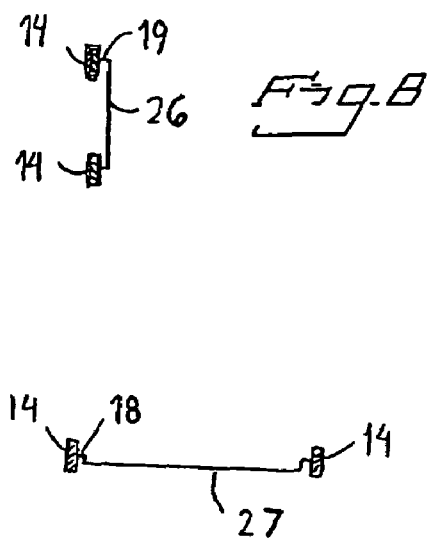

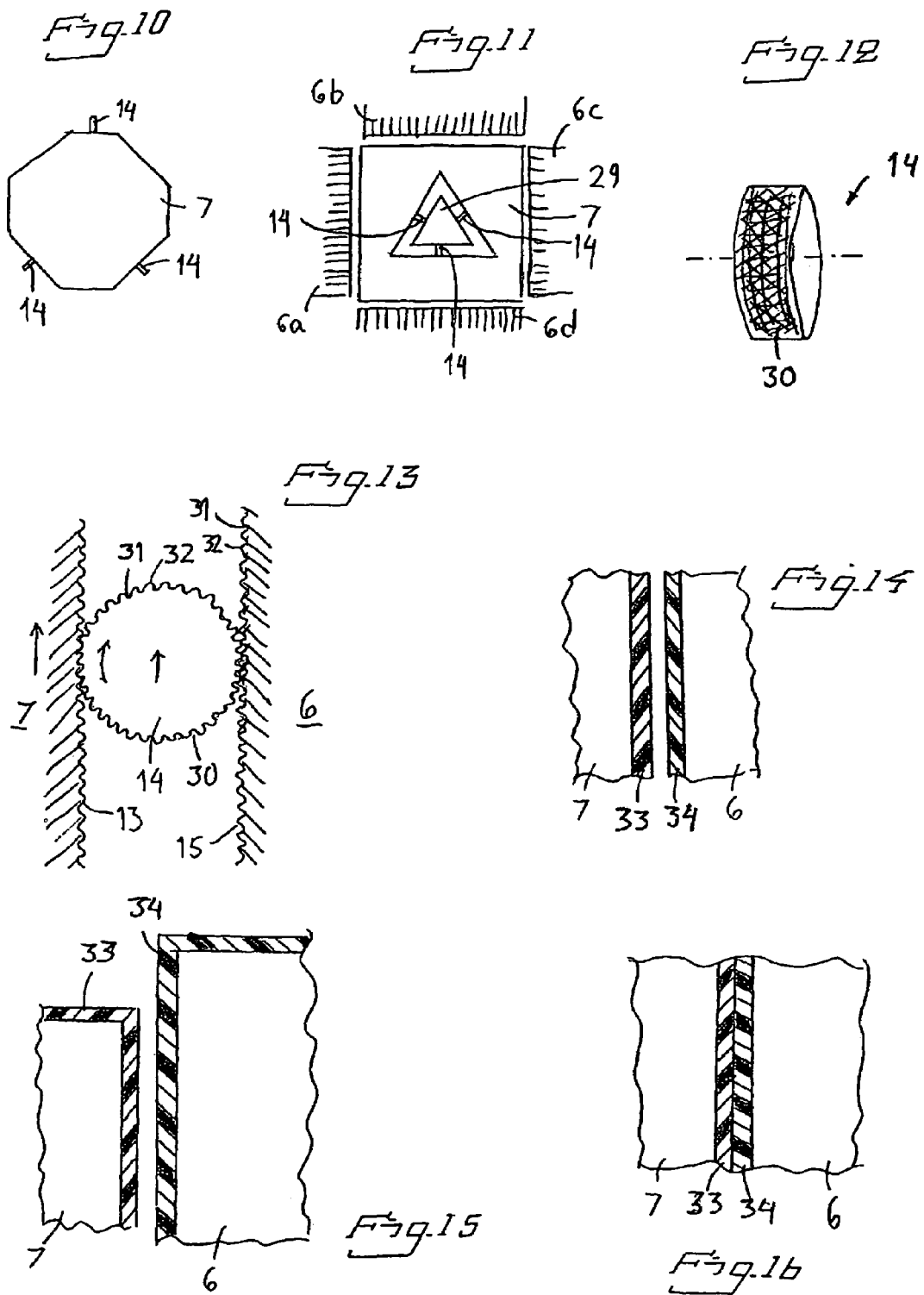

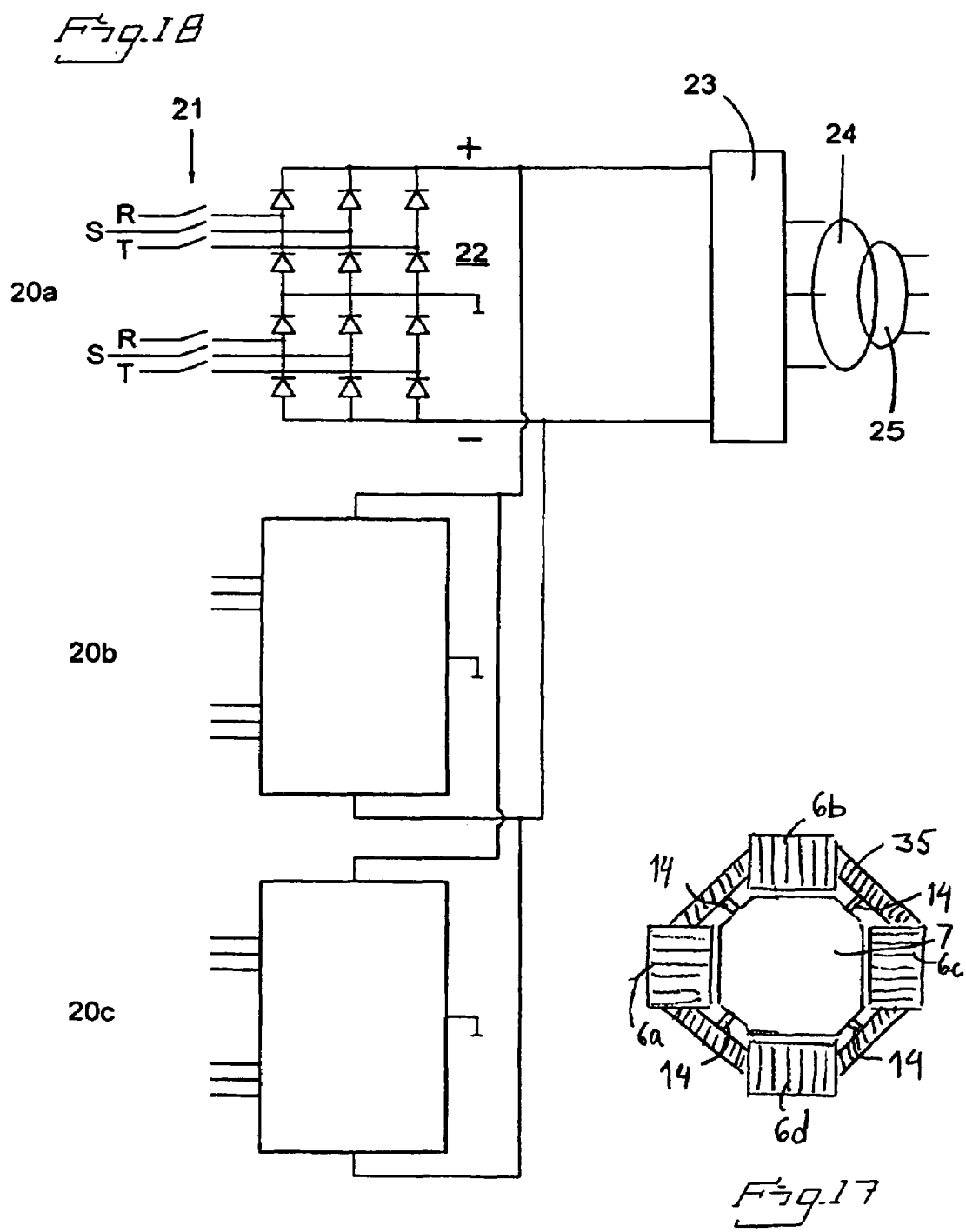

ures of the stator, and have such an extension in the cross direction of the generator that they support the rotor in different directions in the cross direction.

WAVE POWER ASSEMBLY

FIELD OF THE INVENTION

The present invention relates in a first aspect to a wave power assembly comprising a hull and a linear electric generator, the rotor of which by means of connection means is connected to the hull and the stator of which is arranged to be anchored at a sea/lake bottom. The direction of motion of the rotor defines the longitudinal direction of the generator and a plane perpendicular to the direction of motion defines the cross direction of the generator.

In a second aspect, the invention relates to a wave power plant comprising a plurality of wave power assemblies according to the invention.

In a third aspect, the invention relates to the use of the invented wave power assembly in order to produce electric current.

In a fourth aspect, the invention relates to a method for the generation of electric energy.

In the present application, the term rotor is used for the movable part of the linear generator. Thus, it should be appreciated that the term rotor does not relate to a rotary body but a linearly reciprocating body. Thus, by the direction of motion of the rotor, reference is made to the linear direction of motion thereof.

The wave power assembly according to the invention is primarily intended for but not limited to applications up to 500 kW.

The fact that the stator is arranged for anchorage at the bottom of the sea does not necessarily imply that it is situated on the same. Neither that it has to be stiffly connected to the bottom of the sea. Thus, the stator construction may naturally be floatingly supported and the anchorage may only consist of a line or the like, which prevents the assembly to drive away.

BACKGROUND OF THE INVENTION

Wave motions in the sea and large lakes are a potential energy source which till now is very little utilized. The available wave energy depends on the wave height and is naturally different for different locations. The average wave energy during a year is dependent on the different wind conditions, which are highly influenced by the distance of the location from the nearest coast. Measurements have, among other things, been made in the North Sea. At a measuring point approx. 100 km to the west of the coast of Jutland where the depth was approx. 50 m, measurings of the wave height have been made.

In order to utilize the energy that is available by the motions of the sea waves, different types of wave power assemblies for the generation of electric power have been proposed. However, these have not succeeded to successfully compete with conventional electric power production. Wave power plants realized hitherto have in the main been test plants or used for local energy supply to navigation buoys. In order for commercial electricity production to be feasible, and thereby give access to the large energy reserve available in the motions of the sea waves, it is not only required that the setting out of the assemblies is carried out in suitably located places. It is also necessary that the assembly is reliable, has high efficiency as well as low manufacturing and operating costs.

Among the feasible principles of the conversion of wave motion energy to electric energy, a linear generator should in that connection to the largest extent meet these requirements.

The vertical motions of the hull caused by the wave motions can thereby directly be transferred to a reciprocating motion of the rotor of the generator. A linear generator may be made very robust and simple and by it being anchored at the bottom, it becomes solidly unaffectable by streams in the water. The only movable part of the generator will be the reciprocating rotor. By the few movable parts thereof and the simple constructive build-up thereof, the assembly becomes very reliable.

By, for instance, U.S. Pat. No. 6,020,653, a wave power assembly is previously known, which is based on the linear generator principle. Hence, the specification describes a generator anchored at the bottom, which generator produces electric energy from the wave motions of the sea surface. A generator coil is connected to a hull so that the coil moves up and down with the wave motions. A magnetic field acts on the coil when it moves so that an electromagnetic force is generated in the same. The magnetic field is such that it provides a uniform field having a single magnetic orientation along the length of stroke of the entire coil. The generator comprises a base plate on bottom of the sea that carries the magnetic core in which the coil moves.

Furthermore, a wave power assembly provided with a linear electric generator is previously known by U.S. Pat. No. 4,539,485. The rotor thereof consists of a number of permanent magnets and the winding of the generator is arranged in the surrounding stator.

Further, in PCT/SE02/02405, a wave power assembly is disclosed having a linear generator in which the rotor is permanent magnetic and the stator comprises winding forming a plurality of poles distributed in the direction of motion of the rotor.

It is important that the guiding of linear motion of the rotor in relation to the stator is exact and reliable so that the size of the gap between the rotor and stator is retained at an exact value. The gap is in the size of 1-5 mm, preferably about 2 mm. Since a generator of the type in question may be fairly large, insufficient precision in the guiding entails that the size of the gap risks deviating substantially from the predetermined one. This entails asymmetry of the occurring magnetic forces, which results in harmful asymmetric forces on the rotor with the risk of operational disturbances as well as breakdown. Also the electromagnetic transformation of energy is effected negatively by erroneous gap size.

Therefore, great demands are made that the rotor is well mounted in the cross direction, simultaneously great demands are made on the service life of the bearing mounting. An assembly of the kind in question is calculated to be in operation during a time of 30 years or more. Usual ball bearings normally have a service life that is considerably shorter than this. Exchange of bearings is very expensive since frequently the generator is located far out on the sea and at a large depth.

The object of the present invention is, against this background, that for a wave power assembly of the kind in question a bearing mounting of the rotor is provided which overcomes the problems mentioned and which accordingly is simple and reliable and which has a long service life.

SUMMARY OF THE INVENTION

The object set-up has in the first aspect of the invention been attained by the fact that a wave power assembly of the kind defined in the preamble of claim 1 comprises the special features that in the cross direction the rotor is mounted by means of rolling elements arranged between rolling surfaces of the rotor running in the longitudinal direction and support surfaces of a support means, which rolls are arranged to roll against the rolling surfaces of the rotor and the support surfaces of the support means.

Thanks to the rotor in this way rolling to and fro in the support means, there is a very robust bearing mounting. The rolling elements may be made from a strong and wear-resistant material and having a relatively large rolling diameter and obtain thereby an almost unlimited service life. Neither do the rolling surfaces nor the support surfaces constitute any problem in this respect. Furthermore, the position of the rotor in the cross direction will become utmost exact by the fact that it unambiguously is determined by the diameter of the rolling elements. Thereby, by means of the invented wave power assembly, a reliable guiding of the motions of the rotor is attained and a service life of the bearing mounting which ensures that the need for service or bearing exchange is eliminated during the estimated service life of the entire assembly.

According to a preferred embodiment of the invented wave power assembly, the support means consists of the stator of the generator. It is, per se, within the scope of the invention that the support means may consist of a separate means, e.g. a column in the centre of the rotor or of a guide column arranged on the outside of the rotor. However, by utilizing the stator as support means, the advantage is attained that such separate means are eliminated so that the assembly becomes simpler and more inexpensive. Furthermore, it is in relation to the stator that the motion of the rotor shall be fixed. By means of the stator constituting the support means, there will be a direct connection between bearing mounting and generator gap, and thereby an optimum precision.

According to an additional preferred embodiment, the stator is supported by a frame, the support means consisting of the frame. Also here, a close relation between the generator gap and the support surfaces is obtained. In certain cases, it may be advantageous to avoid support surfaces directly on the stator, which is attained by means of this embodiment.

According to an additional preferred embodiment, there are rolling surfaces in at least three planes intersecting each other, the intersecting lines of which planes in cross-section form a polygon. Rolling surfaces arranged in this way constitute a sufficient geometrical condition in order to unambiguously define the position of the rotor in the x as well as the y direction in the cross direction. By means of rolling surfaces in fewer planes or planes that do not intersect each other in the mentioned way, the positioning does not become completely defined via the bearing mounting by the rolling elements, and therefore, in such a case, supplementing bearing-mounting measures have to be used. This need is eliminated by this embodiment.

According to an additional preferred embodiment, in cross-section the rotor is in the main in the shape of a polygon and at least one rolling surface is arranged on each one of at least three of the polygon sides of the rotor. The rotor may, on that occasion, be roller-bearing mounted directly on the sides thereof, which gives a safe and a simple construction.

In that connection, according to an additional preferred embodiment, at least one rolling surface is located on each one of the polygon sides of the rotor. By the fact that the rolling surfaces are arranged on all sides of the rotor, maximum stability and symmetry of the bearing mounting is attained. Although the shape suitably consists of a regular polygon, naturally irregular ones are feasible within the scope of this embodiment.

According to an additional preferred embodiment, in at least one plane, a plurality of rolling elements are arranged distributed in the longitudinal direction and/or the cross direction. By means of a plurality of rolling elements in one and the same plane, a distribution of requisite bearing-mounting force is generally attained, which increased the supporting capacity. This results in an improved bearing-mounting stability and permits weaker rolling elements. Furthermore, by means of rolling elements arranged one after the other in the longitudinal direction, the risk of asymmetric alignment of the rotor in the direction of motion is eliminated. By means rolling elements arranged beside each other in the cross direction, the stability against turning of the rotor around the longitudinal axis thereof is increased. When rolling elements are distributed in the longitudinal as well as the cross direction in the same plane, the corresponding combined effect is attained. What is gained by increased number of rolling elements has naturally to be balanced against the increased complexity of the construction, which thereby will be the case.

According to an additional preferred embodiment, the rolling elements are formed as rolls. Thereby, each rolling element will be able to carry the bearing-mounting force along a line which represents a favourable distribution of the bearing-mounting force in comparison with, e.g., a ball-shaped rolling element.

In that connection, according to an additional preferred embodiment, the rolling surfaces and/or the support surfaces are profiled and/or at least some one of the rolls has a profiled envelope surface. By means of such an embodiment, the risk of sliding arising between the rolls and the rolling and support surfaces, respectively, decreases, something which for a plurality of reasons is important to avoid. Naturally, this is most safely attained if the envelope surfaces of all the rolls as well as both of the rolling and support surfaces are profiled.

According to a preferred embodiment of the profiled embodiment, the profiling consists of a regular pattern of valleys and ridges running in the cross direction, the profiling of the rolls corresponding with the profiling on the rolling and the support surfaces. This entails that the rolls and the support surfaces will engage each other in a cog-like way like in the case of a cogwheel between racks. Thereby, the risk of sliding is entirely eliminated.

According to an additional preferred embodiment, at least some rolling elements are mechanically connected to each other. Thereby is guaranteed that the rolling elements retain the positions thereof in relation to each other. Thereby, a constant pattern for the distribution of the bearing-mounting forces is retained. Furthermore, the risk of any of the rolling elements being released from the position thereof is avoided. Simultaneously, this may constitute an alternative way to avoid sliding. The mechanical joint may be such that the rolling elements arranged one after the other in the longitudinal direction are connected in a train running in the longitudinal direction. Alternatively, rolling elements that are located beside each other in the cross direction may be connected to each other via a transverse holder means. Furthermore, it is possible that rolling elements distributed in the longitudinal direction as well as in the cross direction at one of the sides of the rotor are united in a net-like holder means as well as that all rolling elements are united in a cage-like holder means.

According to an additional preferred embodiment, at least those surfaces of the rotor facing the stator and/or those surfaces on the stator facing the rotor are provided with a surface layer of an insulating material, preferably a plastic material. Said rolling paths may then be arranged on the same surface layer. Furthermore, the surface layer acts as a collision protection for avoiding collision between stator and rotor, the surface layers guaranteeing a smallest gap therebetween.

In that connection, according to a preferred embodiment, the rotor and/or the stator is/are entirely encapsulated by the insulating material. Encapsulation of each of these components entails that the respective component is corrosion protected against surrounding sea or lake water.

According to an additional preferred embodiment in the embodiment having surface layers, the rotor is arranged to slide against the stator with said surface layers as sliding surfaces. Thereby, the rotor also becomes sliding-bearing mounted as a complement to the roller-bearing mounting. The later may, on that occasion, be made in a simpler way with a fewer number of rolling surfaces and rolling elements.

In that connection, according to an additional preferred embodiment, the bearing mounting of the rotor is entirely provided by said sliding surfaces, some rolling elements thus not being arranged for the bearing mounting in the cross direction. This embodiment is simple and the surface layers fulfil a dual function as collision protection and/or corrosion protection as well as sliding bearing. Especially in a wave power assembly having a small generator, this embodiment may be of interest.

The above-mentioned preferred embodiments of the invented wave power assembly are defined in the claims depending on claim 1.

In a second, third and fourth aspect of the invention, the object set-up has been attained by the fact that a wave power plant comprises a plurality of wave power assemblies according to the invention, by the use of a wave power assembly according to the invention to produce electric current, and by a method for production of electric current being carried out by means of a wave power assembly according to the invention, respectively, which are defined in claims 16, 17 and 18, respectively.

By the invented the wave power assembly, the invented use and the invented method, advantages of the corresponding type are gained as in the invented wave power assembly and the preferred embodiments of the same and that have been accounted for above.

The invention is explained closer by the appended detailed description of advantageous embodiment examples of the same, reference being made to the appended drawing figures.

BRIEF DESCRIPTION OF THE DRAWINGS

FIGS. 5-7 is a section corresponding to FIG. 4 of alternative embodiment example of the invention.

FIG. 8 illustrates a detail of an embodiment example of the invention.

FIG. 9 illustrates a similar detail as in FIG. 8 according to an alternative embodiment example.

FIG. 10 is a cross-section through a rotor of an additional alternative embodiment example.

FIG. 11 is a section corresponding to the one in FIG. 3 through an additional alternative embodiment example.

FIG. 12 is a perspective view of a rolling element according to the invention.

FIG. 13 is a cross-section through a rolling element according to an alternative embodiment example.

FIGS. 14-16 is a longitudinal section through a part of the rotor and the stator according to additional alternative embodiment examples.

FIG. 17 is a cross-section through the rotor and the stator according to an additional embodiment example.

FIG. 18 is a diagram illustrating the connection of a plurality of assemblies according to the invention into a wave power plant.

DESCRIPTION OF ADVANTAGEOUS EMBODIMENT EXAMPLES

Figure 1:
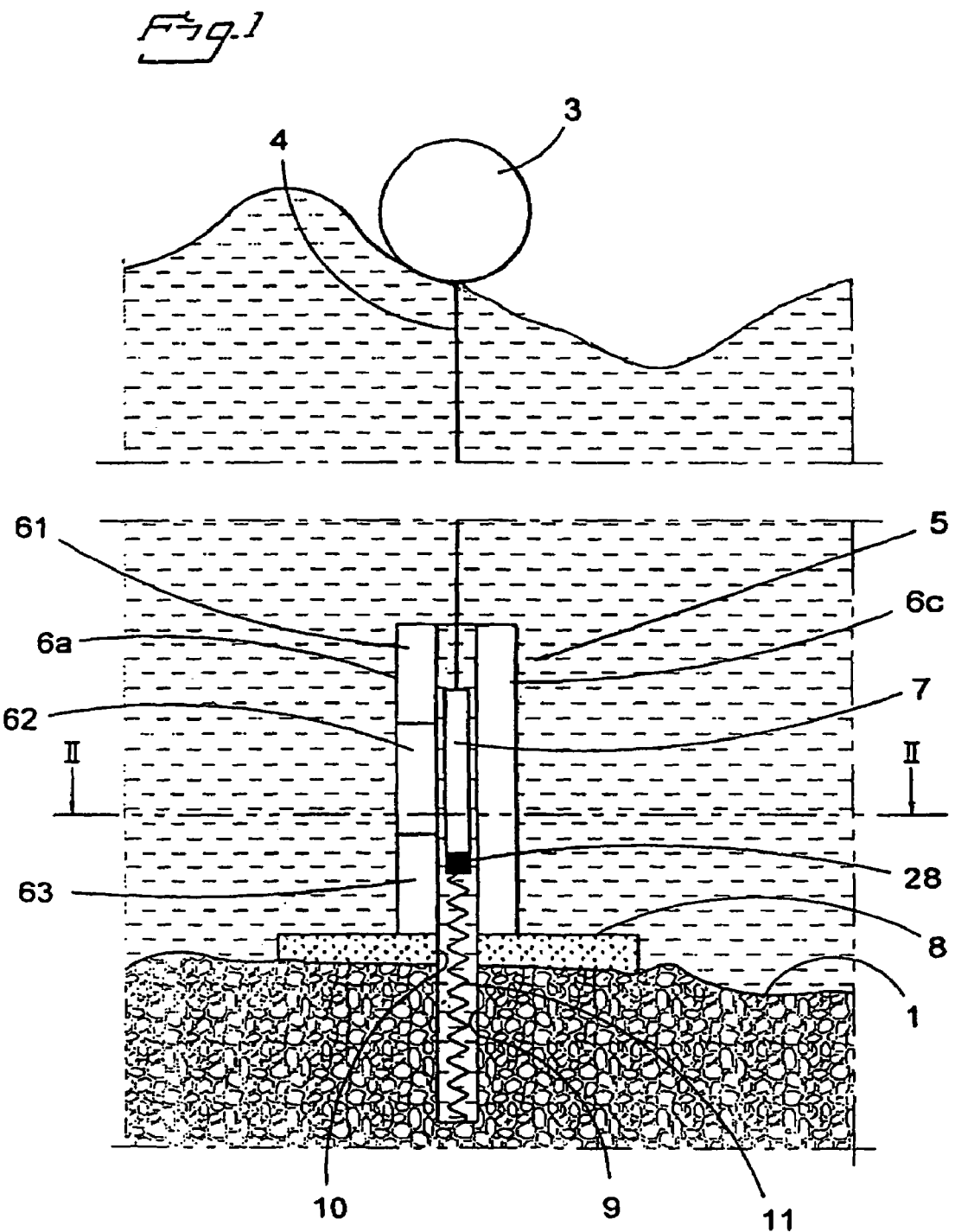
FIG. 1 is a schematic side view of a wave power assembly according to the invention.

FIG. 1 illustrates the principle of a wave power assembly according to the invention. A hull 3 is arranged to float on the sea surface 2. Waves impart reciprocating vertical motion to the hull 3. At the bottom 1, a linear generator 5 is anchored via a base plate 8 fastened at the bottom, which plate may be a concrete slab. At the base plate 8, the stator 6a, 6c of the linear generator is fastened. The stator consists of four vertical column-like stator packs, only two of which are visible in the figure. In the space between the stator packs, the rotor 7 of the generator is arranged. The same is connected to the hull 3 by means of a line 4. The rotor 7 is of permanent magnetic material.

The base plate 8 has a centrally arranged hole 10, and concentrically therewith a bottom hole 9 is recessed in the bottom of the sea. The bottom hole 9 may suitably be lined. At the lower end of the bottom hole 9, a tension spring 11 is fastened, which with the other end thereof is fastened at the lower end of the rotor 7. The hole 10 in the base plate 8 and the bottom hole 9 have a diameter allowing the rotor 7 to move freely through the same.

Each stator pack is composed of a number of modules. In the example shown, it is marked on the stator pack 6a how the same is divided into in three vertically distributed modules 61, 62, 63.

When the hull 3 by the wave motions on the sea surface 2 moves up and down, this motion is transferred via the line 4 to the rotor 7, which receives a corresponding reciprocating motion between the stator packs. Thereby, current is generated in the stator windings. The bottom hole 9 allows the rotor to pass the entire stator in the downward motion thereof.

Figure 2:
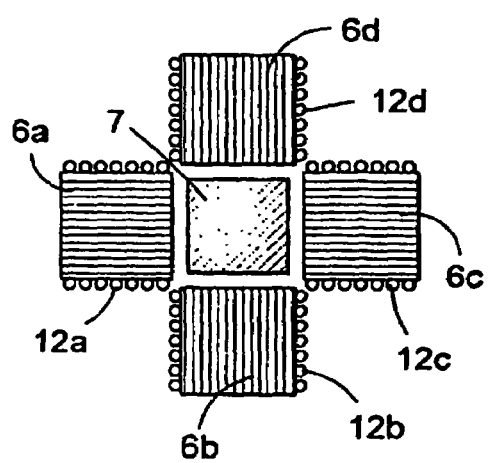
FIG. 2 is a section along the line II-II in FIG. 1.

FIG. 2 is a section along the line II-II in FIG. 1. In this example, the rotor 7 has a square cross-section and a stator pack 6a-6d is arranged at each side of the rotor 7. The winding of the respective stator pack is indicated by 12a-12d. In the figure, the orientation of the sheet-metal plates in each stator pack is also seen. The air gap between the rotor and adjacent stator packs is in the order of some mm. The details significant for the invention are for the sake of clarity omitted from FIGS. 1 and 2.

It should be appreciated that cross-section shape of the rotor may be a polygon having an arbitrary number of sides. Suitably, but not necessarily, the polygon is regular. The rotor may also be circular. By providing stator packs in different directions around the rotor, as large part as possible of the magnetic field is utilized for the induction.

The insulation of the winding consists of a salt water-resistant layer that resists a voltage up to 6 kV. The layer may consist of a polymer such as PVC or the like. Alternatively, enamelled wire may be used. The conductor consists of aluminium or copper. In order to have as small an air gap as possible, it is important that the motion of the rotor 7 is accurately guided.

According to the invention, this is provided by the rotor being mounted in rolling elements. The rolling elements are arranged to roll against rolling surfaces of the rotor and against support surfaces of a support means. Hereinafter, different examples of how the same may be arranged are illustrated.

Figure 3:
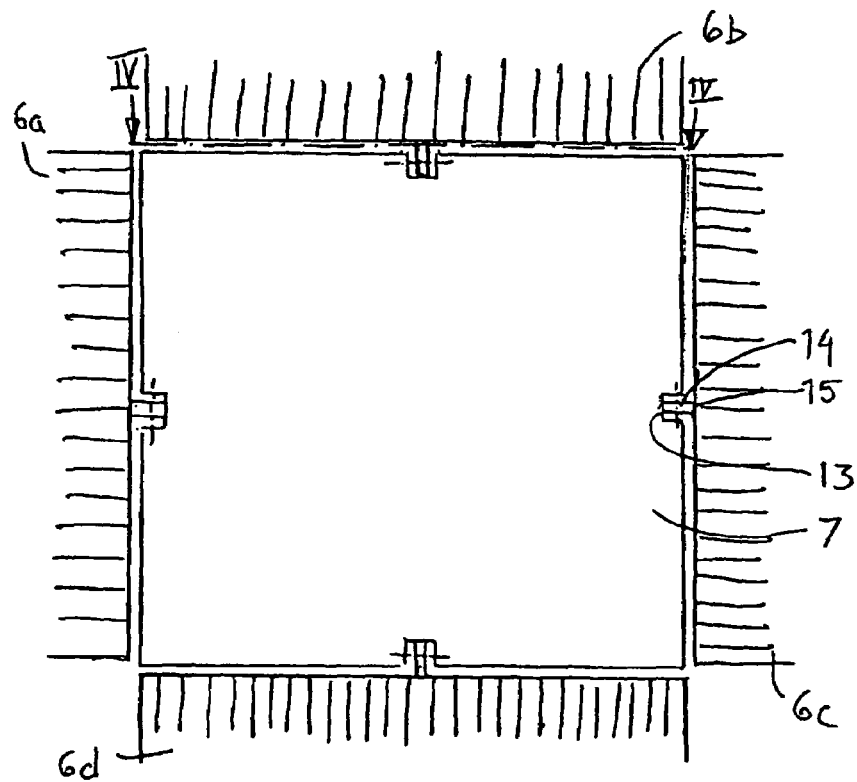
FIG. 3 is an enlarged part section of FIG. 2.

In FIG. 3, an example is shown of how a rotor 7 having a square cross-section is mounted directly in the surrounding stator 6a-6d. On each of the four sides of the rotor, a rolling surface 13 is arranged, recessed in a groove. In each rolling path, there is a rolling element 14 arranged to roll against the respective rolling surface and against a respective support surface 15 of the stator. The rolling elements roll without sliding and will, therefore, move in the direction of motion of the rotor by a speed that is half of the speed of the rotor. In this way, the guiding of the rotor will be distinct so that all the gaps between the rotor and the stator are retained with great exactness.

Figure 4:
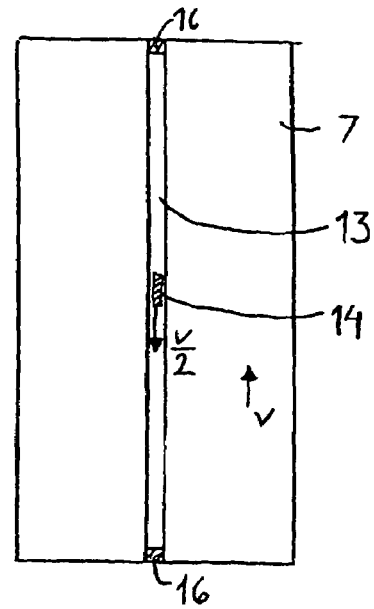
FIG. 4 is a section along the line IV-IV in FIG. 3.3.

FIG. 4 is a section along the line IV-IV in FIG. 3 with the rolling element 14a in an intermediate position on the rolling surface 13a thereof. When the rotor moves upwards by the speed v, the rolling element 14 moves downwards in relation to the rotor by the speed v/2. Hence, by means of a rolling surface 13 that extends along the length of the entire rotor, a length of stroke of the rotor is allowed that is twice as large as the length extension of the rotor. In order to avoid that the rolling element 13a should risk rolling outside the rotor, a stop 16 may be arranged at each end of the rolling surface.

FIG. 5 illustrates an alternative to the example shown in FIG. 4 in a corresponding section. In the embodiment example in FIG. 5, the rolling surface has an extension 17 on both sides so that it extends outside the rotor in the longitudinal direction. Such an embodiment permits a length of stroke of the rotor that is larger than twice the length of the rotor.

FIG. 6 illustrates an additional alternative in a corresponding section. In this case, two rolling elements 14 are arranged in the longitudinal direction one after the other running against the same rolling surface 13.

FIG. 7 illustrates yet an alternative in a corresponding section. Here, two rolling surfaces 13 are arranged on the side of the rotor and a rolling element 14 running in each one of them. The embodiments according to FIGS. 6 and 7 may naturally be combined, and also be combined with the rolling surface extension illustrated in FIG. 5.

The rolling elements in the embodiment according to FIG. 6 may be connected, as is illustrated in FIG. 8. Each one of the rolling elements 14 is rotatably hinged on an axle journal 19, which are connected to a longitudinal strut 26.

Correspondingly, the rolling elements 14 in FIG. 7 located at the side may, as is shown in FIG. 9, be connected to a transverse strut 27 and axle journals 18. Also the embodiments according to FIGS. 6 and 7 may be combined. Furthermore, the rolling elements 14 on different sides of the rotor (see FIG. 3) may be united by a system of struts running in a quadrangle and that run as a rim around the rotor.

In FIG. 10, an example is illustrated with the rotor being of an octahedron-shape, and a rolling element is arranged on three of the sides of the octahedron. Rolling elements may naturally be arranged on all sides thereof.

In the examples in the figures above, the rolling elements 14 are arranged to roll against the rolling surfaces 13 on the outside of the rotor, and against support surfaces 15 arranged on the stator 6. Of course, the support surfaces may be arranged on another outer support means than the stator.

In FIG. 11 an additional embodiment example is illustrated in a cross-section through the rotor 7. The rotor has a longitudinal cavity, in this case having a triangular cross-section. However, it may be of arbitrary shape. Through the cavity, a supporting beam 29 extends of the corresponding cross-section. Here, the rolling elements 14 are arranged between rolling surfaces 13 on the inside of the rotor and support surfaces 15 on supporting beams.

The rolling elements 15 are, as is shown in FIG. 12, suitably cylindrical. The envelope surface 30 on a rolling element is suitably rough or profiled in order to decrease the risk of skidding. Suitably, the rolling surfaces 13 and the support surfaces 14 have a similar structure.

FIG. 13 shows an embodiment example of a rolling element 14 in a cross-section with the envelope surface 30 thereof being profiled with valleys 31 and ridges 39 running in the axial direction of the rolling element. The rolling and the support surfaces 13, 15 co-operating with the rolling element 14 have corresponding valleys 31 and ridges 32.

Thereby, the rolling element will co-operate with the rolling and the support surfaces, respectively, as a cogwheel with a rack.

FIG. 14 shows an embodiment example with the rotor 7 and the stator 6 on the surfaces directed against each other being provided with a surface layer 33, 34 of non-conducting material, such as, e.g., plastic.

In the embodiment example according to FIG. 15, the rotor and each stator unit are entirely encapsulated in a corresponding plastic layer 33, 34.

FIG. 16 shows an embodiment example with the surface layer 33, 34 of plastic on the surfaces of the rotor 7 and the stator 6 directed against each other bridging the entire gap between the rotor and the stator. In this embodiment, the guiding of the rotor is attained by the rotor sliding directly against the stator via the plastic layers 33, 34.

In FIG. 17, an embodiment example is illustrated with the stator packs 6a-6d of the stator 6 being mounted on a frame 35. In this case, the rotor 7 is arranged to, via the rolling elements 14, be mounted against support surfaces of the frame 35.

A wave power plant according to the invention consists of two or more assemblies of the above-described kind. In FIG. 18, it is illustrated how these are connected in order to deliver energy to a mains. In the example shown, the power plant consists of three assemblies symbolically indicated by 20a-20c. Each assembly is, via a breaker or contactor 21 and a rectifier 22, connected to an inverter 23, in a bipolar circuit according to the figure. In the figure, a circuit diagram is drawn only for the assembly Oa. It should be appreciated that the other assemblies 20b, 20c are correspondingly connected. The inverter 23 delivers three-phase current to the mains 25, possibly via a transformer 24 and/or a filter. The rectifiers may be diodes that may be gate-controlled and of the type IGBT, GTO or tyristor, comprise gate-controlled bipolar components or be uncontrolled.

The voltages on the DC side may be connected in parallel, connected in series or a combination of both.

The invention claimed is:

1. A wave power assembly comprising:
    a hull;
    a linear electric generator having a rotor and a stator, said rotor being connected to said hull, said stator being adapted to be anchored to a sea/lake bottom, the direction of motion of said rotor defining the longitudinal direction of said generator;
    a plane perpendicular to the direction of motion defining a cross direction of said generator;
    said rotor having rolling surfaces running in the longitudinal direction;
    rolling elements bearing against said rolling surfaces, said rotor being mounted in the cross direction to said rolling elements; and
    support means having support surfaces, said rolling elements being positioned between said rolling surfaces and said support surfaces, said rolling elements being positioned and configured to roll against said rolling surfaces of said rotor and said support surfaces of said support means.

2. The wave power assembly according to claim 1, wherein said support means consists of said stator of said generator.

3. The wave power assembly according to claim 1, wherein said stator is carried by a frame and said support means consists of said frame.

4. The wave power assembly according to claim 1, wherein said rolling surfaces comprise rolling surfaces in at least three planes intersecting each other, the intersecting lines of which planes in cross-section form a polygon.

5. The wave power assembly according to claim 2, wherein said rolling surfaces comprise rolling surfaces in at least three planes intersecting each other, the intersecting lines of which planes in cross-section form a polygon.

6. The wave power assembly according to claim 3, wherein said rolling surfaces comprise rolling surfaces in at least three planes intersecting each other, the intersecting lines of which planes in cross-section form a polygon.

7. The wave power assembly according to claim 1, wherein said rotor in cross-section is in the form of a polygon and at least one said rolling surface is arranged on each one of at least three of the polygon sides of the rotor.

8. The wave power assembly according to claim 2, wherein said rotor in cross-section is in the form of a polygon and at least one said rolling surface is arranged on each one of at least three of the polygon sides of the rotor.

9. The wave power assembly according to claim 3, wherein said rotor in cross-section is in the form of a polygon and at least one said rolling surface is arranged on each one of at least three of the polygon sides of the rotor.

10. The wave power assembly according to claim 4, wherein said rotor in cross-section is in the form of a polygon and at least one said rolling surface is arranged on each one of at least three of the polygon sides of the rotor.

11. The wave power assembly according to claim 7, wherin at least one said rolling surface is arranged on each one of said polygon sides of said rotor.

12. The wave power assembly according to claim 1, wherein in at least one plane a plurality of said rolling elements are arranged, distributed in the longitudinal direction or the cross direction, or both.

13. The wave power assembly according to claim 2, wherein in at least one plane a plurality of said rolling elements are arranged, distributed in the longitudinal direction or the cross direction, or both.

14. The wave power assembly according to claim 3, wherein in at least one plane a plurality of said rolling elements are arranged, distributed in the longitudinal direction or the cross direction, or both.

15. The wave power assembly according to claim 4, wherein in at least one plane a plurality of said rolling elements are arranged, distributed in the longitudinal direction or the cross direction, or both.

16. The wave power assembly according to claim 7, wherein in at least one plane a plurality of said rolling elements are arranged, distributed in the longitudinal direction or the cross direction, or both.

17. The wave power assembly according to claim 11, wherein in at least one plane a plurality of said rolling elements are arranged, distributed in the longitudinal direction or the cross direction, or both.

18. The wave power assembly according to claim 1, wherein said rolling elements are made as rolls.

19. The wave power assembly according to claim 2, wherein said rolling elements are made as rolls.

20. The wave power assembly according to claim 3, wherein said rolling elements are made as rolls.

21. The wave power assembly according to claim 4, wherein said rolling elements are made as rolls.

22. The wave power assembly according to claim 7, wherein said rolling elements are made as rolls.

23. The wave power assembly according to claim 11, wherein said rolling elements are made as rolls.

24. The wave power assembly according to claim 12, wherein said rolling elements are made as rolls.

25. The wave power assembly according to claim 18, wherein said rolling surfaces and/or said support surfaces are profiled and/or at least some one of said rolls has a profiled envelope surface.

26. The wave power assembly according to claim 25, wherein said profiled envelope surface comprises profiling in the form of a regular pattern of valleys and ridges running in the cross direction, said profiling on each roll being provided with a profiled envelope surface which corresponds with the profiling of said rolling surfaces and said support surfaces.

27. The wave power assembly according to claim 1, wherein at least some of said rolling elements are mechanically connected with each other.

28. The wave power assembly according to claim 4, wherein at least some of said rolling elements are mechanically connected with each other.

29. The wave power assembly according to claim 7, wherein at least some of said rolling elements are mechanically connected with each other.

30. The wave power assembly according to claim 12, wherein at least some of said rolling elements are mechanically connected with each other.

31. The wave power assembly according to claim 25, wherein at least some of said rolling elements are mechanically connected with each other.

32. The wave power assembly according to claim 1, wherein at least the surfaces of said rotor facing said stator and/or the surfaces of said stator facing said rotor are provided with a surface layer of insulating material.

33. The wave power assembly according to claim 32, wherein said insulating material is a plastic material.

34. The wave power assembly according to claim 1, wherein at least some rolling elements are mechanically connected with each other.

35. The wave power assembly according to claim 32, wherein said rotor is entirely encapsulated by said insulating material and/or said stator is entirely encapsulated by said insulating material.

36. The wave power assembly according to claim 32, wherein said rotor is arranged to slide against said stator with said surface layer as a sliding surface.

37. The wave power assembly according to claim 35, wherein said rotor is arranged to slide against said stator with said surface layer as a sliding surface.

38. The wave power assembly according to claim 36, wherein said sliding surface provides a bearing mounting of said rotor in the cross direction, no said rolling elements are arranged for bearing mounting in the cross direction.

39. The wave power assembly according to claim 37, wherein said sliding surface provides a bearing mounting of said rotor in the cross direction, no said rolling elements are arranged for bearing mounting in the cross direction.

40. A wave power plant comprising a plurality of said wave power assemblies according to claim 1.

41. The use of a wave power assembly according to claim 1 to generate electric energy.

42. A method to generate electric energy by means of at least one wave power assembly according to claim 1.

* * * * *